United States Patent [19]

Wussow

[11] Patent Number: 4,574,449

[45] Date of Patent: Mar. 11, 1986

[54] METHOD FOR RETROFITTING CLUTCH HOUSING

[76] Inventor: Harley E. Wussow, P.O. Box 270, Prescott, Ariz. 86302

[21] Appl. No.: 721,273

[22] Filed: Apr. 8, 1985

[51] Int. Cl.⁴ .................... B23P 7/00; B23P 19/04; F16D 47/02
[52] U.S. Cl. ............................ 29/402.06; 192/48.5
[58] Field of Search .............. 29/530, 401, 401.1, 29/402.1–402.21; 192/48.5

[56] References Cited

PUBLICATIONS

Chilton's Repair & Tuneup Guide, Mazda 1971–1984, Published by Chilton Book Co., Radnor, Pa., p. 141.

Primary Examiner—Howard N. Goldberg
Assistant Examiner—Vernon K. Rising
Attorney, Agent, or Firm—Drummond & Nissle

[57] ABSTRACT

As improved method for maintenancing the clutch housing in the transmission of a vehicle engine. The housing includes a cylindrical inner wall provided with a plurality of spaced apart U-shaped grooves each shaped and dimensioned to receive and house one of the radially projecting spaced apart U-shaped tangs on the periphery of a circular clutch plate positioned inside the housing, the spacing between the housing grooves generally corresponding to the spacing between the clutch plate tangs but only permitting certain ones of the tangs on the clutch plate to contact their respective grooves during operation of the transmission. The improved method retrofits the U-shaped grooves of the transmission housing such that all tangs on a clutch plate mounted in the housing simultaneously contact and bear against their respective U-shaped grooves in the housing during operation of the transmission.

1 Claim, 9 Drawing Figures

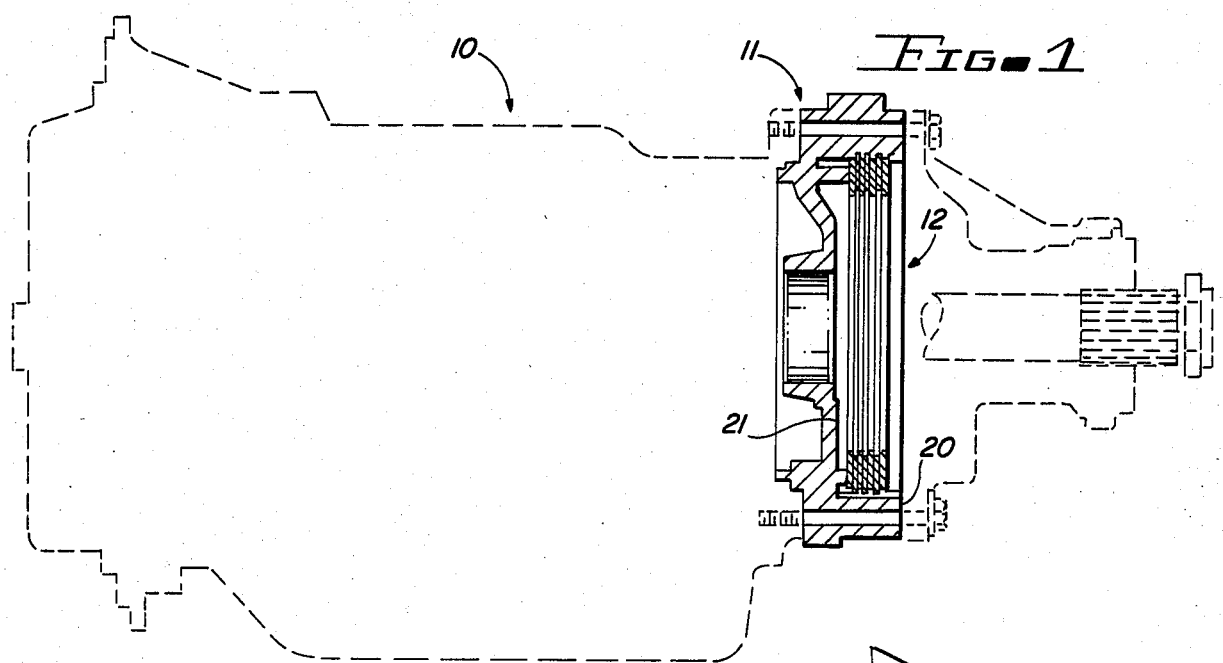
Fig-1
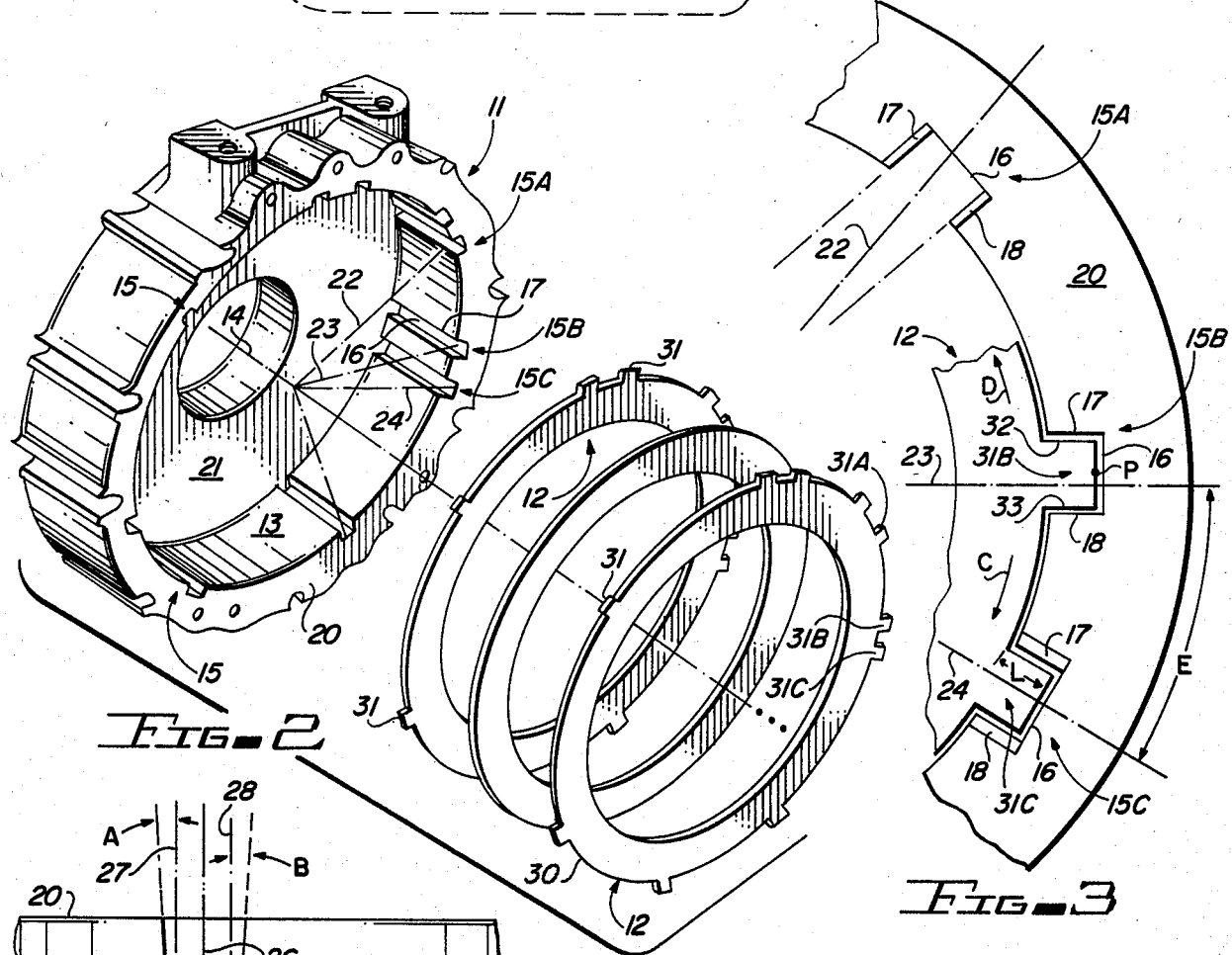
Fig-2
Fig-3
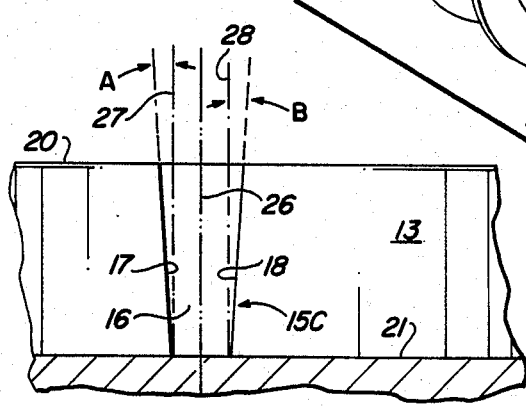
Fig-4

METHOD FOR RETROFITTING CLUTCH HOUSING

This invention relates to a method for maintenancing the transmission of a vehicle engine.

More particularly, the invention relates to a method for maintenancing a transmission of the type including a housing having a cylindrical inner wall provided with a plurality of spaced apart U-shaped grooves each shaped and dimensioned to receive and house one of the radially projecting spaced apart U-shaped tangs on the periphery of a circular clutch plate positioned inside the housing, the spacing between the housing grooves generally corresponding to the spacing between the clutch plate tangs but only permitting certain ones of the tangs on the clutch plate to contact their respective grooves during operation of the transmission apparatus, each tang being intended to bear against and contact its respective U-shaped grooves along at least one edge of the tang during operation of the transmission.

In still another respect, the invention relates to a method for retrofitting worn U-shaped tang grooves in the housing of a transmission of the type described, the method retrofitting the worn U-shaped grooves such that all tangs on a clutch plate mounted in the transmission housing generally simultaneously contact and bear against their respective U-shaped grooves in the housing during operation of the transmission.

In a further respect, the invention relates to a method for retrofitting worn U-shaped tang grooves in the housing of a transmission of the type described, the method retrofitting worn U-shaped grooves such that a U-shaped clutch plate tang generally continuously contacts its U-shaped groove along the entire length of one edge of the tang.

Housings of the type found in Allison 640, 643, 650 and 653 transmissions are commonly fabricated from aluminum and include a generally cylindrical inner wall circumscribing an imaginary longitudinal axis. A plurality of spaced apart generally U-shaped grooves are formed in the inner wall. Each groove has a bottom surface and a pair of side surfaces upwardly depending from the bottom surface. The planar bottom surface of each groove is generally parallel to the longitudinal axis of the cylindrical inner wall of the housing. Each U-shaped groove is shaped and dimensioned to receive and house one of the outwardly projecting spaced apart U-shaped tangs on the peripheral edge of each of a plurality of circular steel clutch plates positioned in the housing. During operation of the transmission at least one edge of each tang is intended to contact and bear against a side surface of the groove in which the tang is positioned.

Several problems are associated with maintenancing housings in conventional transmissions like the Allison 640, 643, 650 and 653 transmissions. The tangs on the periphery of each clutch plate in such transmissions are shaped and dimensioned and spaced apart to within tolerances of approximately two-thousandths of an inch. In contrast, when the transmission housing is fabricated the U-shaped grooves on the inner wall of the housing are not accurately spaced, and the spacing between the U-shaped grooves does not precisely correspond to the spacing between tangs on clutch plates carried in the housing. Consequently, during operation of the transmission only a portion of the tangs on a clutch plate actually contact and bear against their respective grooves in the transmission housing, causing the grooves contacted by clutch plate tangs to wear at an accelerated rate. Another long-standing problem associated with conventional aluminum transmission housings is that the side surfaces of each U-shaped groove formed in the inner cylindrical wall of the housing are not parallel to an imaginary plane passing through the longitudinal axis of the inner wall and through the bottom surface of the U-shaped groove. The side surfaces of each U-shaped groove instead slope or skew away from one another and from the imaginary plane passing through the longitudinal axis of the housing and through the bottom surface of the U-shaped groove. The skewed side surfaces of the U-shaped grooves accelerate the rate of wear of the side walls of the grooves.

The conventional process for repairing worn tang grooves in a transmission housing consists of forming a layer of solder over the side and bottom surfaces of the grooves. This process has numerous disadvantages. The heat applied to melt solder over walls of the groove tends to destroy the temper of the aluminum, increasing the susceptibility of the aluminum to wear. The solder is generally softer than the aluminum and wears at an accelerated rate, necessitating frequent disassembly and repair of the U-shaped tang grooves in the transmission housing. Finally, soldering the surfaces of U-shaped tang grooves in a transmission housing does not compensate for the uneven spacing of the grooves or for the skewed side wall surfaces of the grooves.

Accordingly, it would be highly desirable to provide an improved method for maintenancing and retrofitting the U-shaped tang-receiving grooves formed on the inner wall of the housing of a conventional vehicle transmission, the maintenancing method compensating for the uneven spacing and skewed side wall surfaces of the tang-receiving grooves and permitting retrofitting of the grooves without affecting the temper of the metal comprising the original transmission housing.

Therefore, it is a principal object of the invention to provide an improved method for maintenancing the transmission of a vehicle engine.

Another object of the invention is to provide an improved method for maintenancing a conventional transmission of the type including a housing having a plurality of spaced apart U-shaped grooves shaped and dimensioned to receive and house the radially projecting U-shaped tangs on the periphery of a circular clutch plate positioned inside the housing, the housing grooves being spaced apart such that only certain of the tangs on the clutch plate contact the grooves during operation of the transmission.

A further object of the invention is to provide an improved method for retrofitting the U-shaped tang-receiving grooves in a transmission housing of the type described such that all tangs on a clutch plate mounted inside the housing generally simultaneously contact their respective U-shaped grooves in the housing during operation of the transmission.

Still another object of the invention is to provide an improved method for retrofitting the U-shaped tang-receiving grooves in the housing of a transmission of the type described, the method permitting the ready retrofitting of U-shaped grooves without affecting the temper of metal comprising the transmission housing.

These and other, further and more specific objects and advantages of the invention will be apparent to those skilled in the art from the following detailed description thereof, taken in conjunction with the drawings, in which:

FIG. 1 is a partial side section view illustrating a conventional transmission housing and clutch plates operatively associated therewith;

FIG. 2 is an exploded assembly view of the transmission housing and clutch plates of FIG. 1;

FIG. 3 is a partial section view of the transmission housing of FIG. 2 illustrating the spatial relationship of the tang-receiving grooves formed therein;

FIG. 4 is a partial section view of the clutch transmission housing of FIG. 2 further illustrating the construction thereof;

Figure 5:
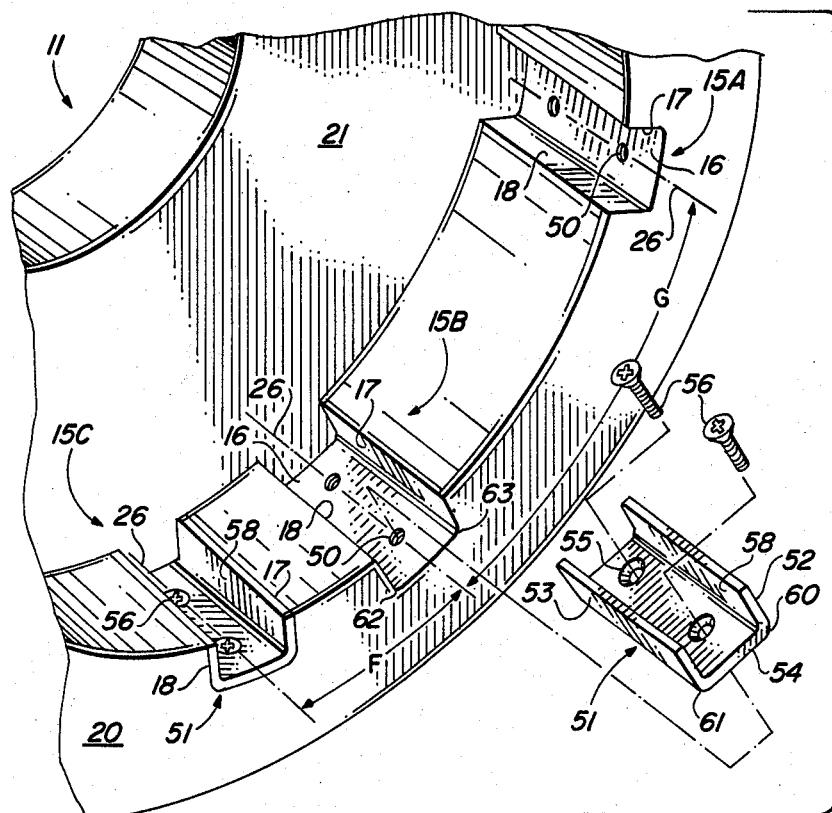
FIG. 5 is a perspective view illustrating retrofitting of a conventional transmission housing in accordance with the method of the invention.

Briefly, in accordance with my invention, I provide an improved method for retrofitting a transmission clutch apparatus. The apparatus includes a generally cylindrical hollow housing having a cylindrical inner wall circumscribing an imaginary longitudinal axis, the inner wall having a plurality of spaced apart generally U-shaped grooves formed therein, each groove having a bottom surface and a pair of side surfaces upwardly depending from the bottom surface, the bottom surface of each groove being generally parallel to the imaginary longitudinal axis; and, at least one plate disposed in the hollow housing and having a circular outer edge with a plurality of radially outwardly projecting spaced-apart U-shaped tangs attached thereto. Each of the U-shaped grooves of the housing is shaped and dimensioned and spaced along the inner wall such that it receives one of the radial tangs, such that the side surfaces diverge away from one another and from a radial imaginary plane passing through the longitudinal axis and the bottom surface, and, such that only certain of the tangs simultaneously contact the side walls of the U-shaped grooves at one time during operation of the apparatus, the simultaneous contact of only certain of the radial tangs with the walls of the U-shaped grooves increasing the rate of wear of the contacted grooves. The improved method of the invention comprises the steps of disassembling the transmission clutch apparatus; machining the U-shaped grooves; inserting and securing a U-shaped insert in each of the machined U-shaped grooves; and, assembling the clutch transmission apparatus with the circular plate in the clutch housing and the tangs thereof projecting into and positioned in the U-shaped inserts. The inserts each have inner side walls and an inner bottom wall. The U-shaped grooves are machined to enlarge each of the grooves to receive the U-shaped inserts; to true the shape of each of the U-shaped grooves such that the side walls thereof are generally parallel to said radial imaginary plane; and, to adjust the spacing between the grooves such that when the inserts are secured therein the spacing between the inserts corresponds to the spacing between the radial tangs on the periphery of the circular plate when the plate is installed in the housing. The correspondence between the insert spacing and tang spacing insures that the radial tangs will each generally simultaneously contact at least one of the side walls of each of the inserts during operation of the apparatus.

Turning now to the drawings in which the presently preferred embodiments of the invention are shown for the purpose of illustrating the practice thereof and not by way of limitation of the scope of the invention, and in which like reference characters represent corresponding elements throughout the several views, FIG. 1 illustrates an Allison transmission Model No. MT-650 generally indicated by reference character 10 and including transmission housing 11 and a series of circular clutch plates 12 carried in housing 11. As illustrated in FIG. 2, housing 11 includes face 20, back wall 21 and cylindrical inner wall 13 circumscribing imaginary longitudinal axis or centerline 14 thereof. A plurality of spaced apart generally U-shaped grooves 15 are formed in inner wall 13, including grooves 15A, 15B and 15C. Each groove 15 has a generally planar bottom surface 16 and a pair of inner side surface 17, 18 outwardly depending from bottom surface 16. Bottom surface 16 of each groove 15 is generally parallel to imaginary longitudinal axis 14 and perpendicular to a radial line extending from longitudinal axis 14 over the shortest distance from axis 14 to bottom surface 16. For example, in FIG. 2 radial lines 22, 23, 24 each lie in the imaginary plane passing through the entire circular face 20 of housing 11. Elongate planar bottom surface 16 of groove 15A is perpendicular to radial line 22. Bottom surface 16 of groove 15B is perpendicular to radial line 23, and surface 16 of groove 15C is perpendicular to line 24. An imaginary radial plane 76 (not shown) passing through and containing both axis 14 and line 22 is perpendicular to surface 16 of groove 15A. Surface 16 of groove 15B is perpendicular to an imaginary radial plane 77 (not shown) passing through and containing both axis 14 and radial line 23. An imaginary radial plane 78 (not shown) passing through and containing both axis 14 and radial line 24 is perpendicular to surface 16 of groove 15C. The planar bottom surface 16 of each groove 15 has an imaginary longitudinal axis or centerline (FIG. 4) which is generally parallel to axis 14 of housing 11.

It is preferred that each side wall 17, 18 of a groove 15 be generally parallel to the longitudinal axis 26 of the groove and parallel to the adjacent edges of a clutch plate tang positioned in the groove. As long as inner walls 17, 18 of a groove 15 are generally parallel to axis 26 of surface 16, walls 17 and 18 can each be perpendicular to bottom surface 16 can each lie in its own radial plane passing through and containing axis 14 and respective side surface 17, 18, or, can each be otherwise oriented. As utilized herein, walls 17, 18 of a groove 15 shall be considered to be "parallel" to a radial plane whenever walls 17 and 18 are generally parallel to axis centerline 26 of the groove and parallel to the adjacent edges of a clutch plate tang positioned in the groove, the radial plane passing through and containing axis 14 and passing through bottom 16 of the groove 15.

In conventional transmission housings 11 side surfaces 17 and 18 of a groove 15 are slightly skewed away from axis 26 in the manner illustrated in FIG. 4. In FIG.

4 arrows A and B indicate the skew angles of walls 17 and 18 with respect to their desired parallel orientation to centerline 26. Angles A and B are typically three to four degrees. In FIG. 4 dashed lines 27, 28 are parallel to longitudinal axis 26 of surface 16.

In FIG. 3 groove 15B is illustrated with walls 17, 18 thereof formed in a preferred orientation generally perpendicular to bottom surface 16, parallel to longitudinal centerline 26 of bottom surface 16, and parallel to radial line 23. In FIGS. 3 and 4 groove 15C has side surfaces 17, 18 which are skewed with respect to centerline 26. Side wall surfaces 17 and 18 of groove 15A in FIG. 3 are skewed with respect to centerline 26 and radial line 22.

Housing 11 receives clutch plates 12 having circular peripheral edge 30 provided with U-shaped radially outwardly projecting spaced-apart tangs 31, including tangs 31A, 31B, and 31C. When plates 12 are inserted in housing 11, U-shaped grooves 15A, 15B and 15C receive tangs 31A, 31B and 31C, respectively. Each tang 31 includes outer edges 32, 33, 34. Each edge 34 has a centerpoint P. Edges 32 and 33 of a tang 31 should be parallel to the sides 17, 18 of the groove 15 housing the tang. If an edge 32, 33 of a tang 31 is parallel to its adjacent wall 17, 18, then the edge 32, 33 will generally contact wall 17, 18 along substantially the entire length of edge 32, 33.

When a clutch plate 12 is rotated in housing 11 in the direction of arrow C in FIG. 3, edge 33 of each tang 31 bears against and contacts wall 18 of its respective groove 15. Edge 32 of each tang 31 bears against and contacts wall 17 of its respective groove 15 when the clutch plate 12 is rotated in the direction of arrow D in FIG. 3.

As would be appreciated by those of skill in the art, it is desireable to have each tang 15 on a clutch plate 12 simultaneously contact its respective U-shaped housing groove 15 during operation of the transmission of FIG. 1. In order for this to occur, the distance or angle between any pair of radial lines each pasing through one of the centerlines 26 of two grooves 15 must correspond to the distance or angle between a pair of radial lines each passing through one of the centerpoints P of edges 34 of tangs 31 housed in the grooves. In conventional transmissions the distance between a pair of tangs 31 on one clutch plate 12 is equivalent to the distance between the identical tangs on another plate 12 to a tolerance of approximately two thousandths of an inch. However, conventional manufacturing limitations have long dictated that the distances between a pair of grooves 15 in a transmission housing cannot be accurately controlled. As a result, only certain ones of the tangs 31 on a clutch plate 12 will contact their respective housing grooves 15 during operation of the transmission, causing rapid wear of grooves 15 contacted by tangs 31.

Figure 6A:
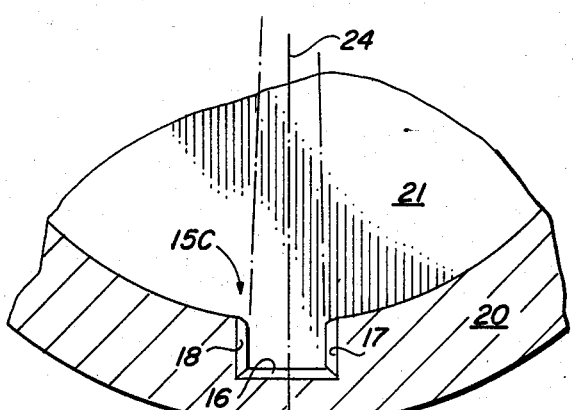
FIG. 6A is a section view of a conventional transmission housing illustrating the shape of a U-shaped tangreceiving groove formed therein.
Figure 6C:
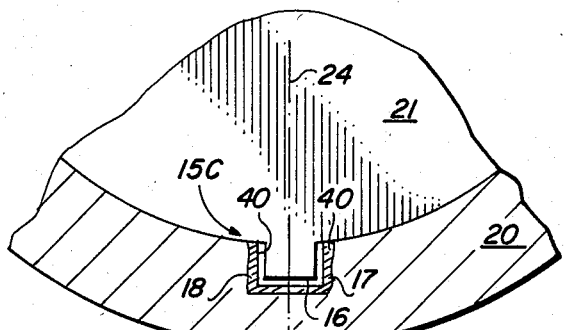
FIG. 6C is a section view of the clutch transmission housing of FIG. 6B illustrating the U-shaped groove thereof after it has been soldered in accordance with prior art maintenancing procedures; and, FIG. 7 is a section view of the clutch transmission housing of FIG. 6A after the U-shaped groove thereof has been retrofitted in accordance with the method of the invention.
Figure 6B:
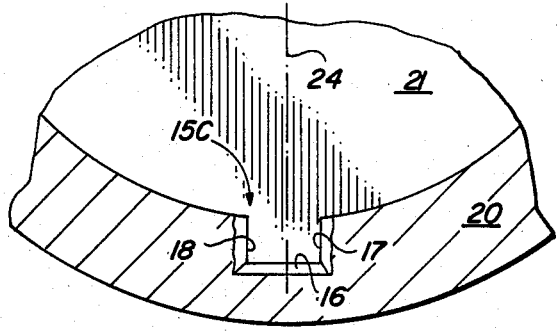
FIG. 6B is a section view of the transmission housing of FIG. 6A illustrating a worn U-shaped tang-receiving groove therein.
Figure 7:
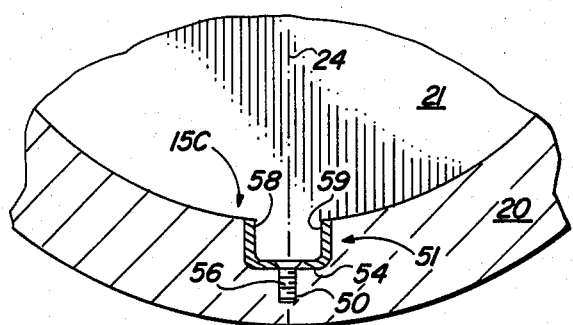

FIGS. 3 and 6A illustrate groove 15C having side surfaces 17, 18 skewed in the manner found in conventional transmission housings. FIG. 6B depicts the groove 15C of FIG. 6A after the transmission housing has been utilized for some time and the inner walls 17, 18 of the groove have been misshapen by contact with tangs 31C on clutch plates 12. The conventional procedure for repairing the worn groove of FIG. 6B is to heat the metal comprising the walls of the groove and to solder the inner surfaces of the groove. FIG. 6C depicts groove 15C of FIG. 6B after the inner surfaces of the groove have been coated with a layer of solder 40. As is shown in FIG. 6C, solder 40 generally does not compensate for the skewing of walls 17, 18 with respect to centerline 26 of bottom surface 16 of groove 15C.

In the method of the invention, the transmission housing of FIG. 1 is disassembled and each groove 15 is machined to enlarge the groove to receive an U-shaped insert, to correct the orientation of the inner walls 17, 18 such that the walls are parallel to centerline 26 of the groove, and, to correct the spacing between the grooves such that the distance between the centerlines 26 of any pair of grooves 15 generally corresponds to the distance between the midpoints P of the tangs 31 received by the grooves. For example, FIG. 5 illustrates grooves 15A, 15B and 15C after the grooves have been machined to provide the corrections just described. In FIG. 5 the inner side walls 17, 18 of each groove are parallel to the centerline 26 of the groove, the distance or angle between centerlines 26 of machined grooves 15A and 15B is indicated by arrows F and corresponds to the distance or angle between midpoints P of tangs 31B and 31C indicated by arrows E in FIG. 3, the distance or angle between centerlines 26 of grooves 15B and 15C is indicated by arrows G and corresponds to the distance or angle between midpoints P of tangs 31A and 31B, and, inner walls 17 and 18 of each groove 15A, 15B, 15C are perpendicular to bottom surface 16 thereof. As earlier noted, inner walls 17, 18 can each lie in a radial plane. For instance, walls 17 and 18 of groove 15A can be slightly inwardly canted to be parallel to and contained in a radial plane passing through and containing axis 14 and the respective wall 17, 18. Of primary importance, however, is that inner walls 17, 18 of a groove 15 be parallel to the edges 32, 33 of a tang 31 positioned in the groove so that each edge 32, 33 of the tang will generally contact a wall 17, 18 of the groove along substantially the entire length of edge 32, 33.

After grooves 15 have been machined in the manner described above, internally threaded apertures 50 are formed through bottom surface 16 of each groove 15 and U-shaped inserts are secured in the grooves. Inserts 51 include legs 52, 53 perpendicular to and connected to panel member 54. Countersunk apertures 55 are formed through member 54 to receive externally threaded screws 56. After insert 51 is inserted in a groove 15, inner wall surfaces 58, 59 are parallel to edges 32, 33 of a tang 31 subsequently positioned within insert 51. Inserts 51 presently comprise die cut chrome plated steel but can be fabricated from any suitable material. To avoid having to drill and tap apertures 50 and 55 and utilize screws 56, inserts 51 can be sized to be press fit into grooves 15 and can other wise be secured in the grooves. After inserts 51 have been secured in grooves 15, the transmission of FIG. 1 is reassembled with clutch plates 12 positioned in housing 11.

As shown in FIG. 5, U-shaped grooves 15A, 15B, 15C formed in housing 11 can be provided with radii 62, 63 to receive radii 60, 61 formed on U-shaped inserts 51. Screws 56 can be self-tapping so that apertures 50 do not have to be internally threaded. Screws 56 having conventional flat heads can be utilized so apertures 55 of U-shaped inserts 51 do not have to be countersunk in the manner shown in FIG. 5.

While the bottom surface 16 of a groove 15C formed in a conventional prior art housing 11 can be perpendicular to a radial line 24, surface 16 can also, as illustrated in FIG. 6A, be slightly sloped with respect to and only generally perpendicular to radial line 24.

Having desribed my invention in such terms as to enable those skilled in the art to understand and practice it, and having identified the presently preferred embodiments thereof, I claim:

1. A method for retrofitting a transmission clutch apparatus, said apparatus including
   a generally cylindrical hollow housing having a cylindrical inner wall circumscribing an imaginary longitudinal axis, said inner wall having a plurality of spaced apart generally U-shaped grooves formed therein, each groove having a bottom surface and a pair of side surfaces upwardly depending from said bottom surface, said bottom surface of each groove being generally parallel to said imaginary longitudinal axis,
   at least one plate disposed in said hollow housing and having a circular outer edge with a plurality of radially outwardly projecting spaced-apart U-shaped tangs attached thereto, each of said U-shaped grooves of said housing being shaped and dimensioned and spaced along said inner wall such that
   each of said grooves receives one of said radial tangs,
   said side surfaces diverge away from one another and from a radial imaginary plane passing through said longitudinal axis and said bottom surface,
   only certain of said tangs contact said side walls of said U-shaped grooves at one time during operation of said apparatus, said simultaneous contact of only certain of said radial tangs with said walls of said U-shaped grooves increasing the rate of wear of said contacted grooves,
said method comprising the steps of
   (a) disassembling said transmission clutch apparatus;
   (b) machining said U-shaped grooves to
      (i) enlarge each of said grooves to receive U-shaped inserts having inner side walls and an inner bottom wall,
      (ii) true the shape of each of said U-shaped grooves such that said side walls thereof are generally parallel to said radial imaginary plane, and
      (iii) adjust the spacing between said grooves such that when said inserts are secured therein the spacing between said inserts corresponds to the spacing between said radial tangs on said periphery of said circular plate when said plate is installed in said housing, said correspondence between said insert spacing and tang spacing insuring that said radial tangs will each generally simultaneously contact at least one of said side walls of each of said inserts during operation of said apparatus; and,
   (c) inserting and securing one of said U-shaped inserts in each of said machined U-shaped grooves; and,
   (d) assembling said clutch transmission apparatus with said circular plate in said clutch housing and said tangs projecting into and positioned in said U-shaped inserts.

* * * * *